US007536927B2

(12) United States Patent

Fleytman

(10) Patent No.: US 7,536,927 B2

(45) Date of Patent: May 26, 2009

(54) WINDOW LIFT DRIVE FOR RAISING AND LOWERING WINDOWS IN A VEHICLE DOOR

(75) Inventor: Yakov Fleytman, Flowery Branch, GA (US)

(73) Assignee: Brose Fahrzeugteile GmbH & Co. Kommanditgesellschaft, Würzburg, Würzburg (DE)

( * ) Notice: Subject to any disclaimer, the term of this patent is extended or adjusted under 35 U.S.C. 154(b) by 120 days.

(21) Appl. No.: 11/798,553

(22) Filed: May 15, 2007

(65) Prior Publication Data

US 2007/0295124 A1 Dec. 27, 2007

Related U.S. Application Data

(60) Provisional application No. 60/810,710, filed on Jun. 5, 2006.

(51) Int. Cl.
*F16H 19/04* (2006.01)

(52) U.S. Cl. .......................... 74/89.17; 49/349; 49/362

(58) Field of Classification Search ..................... 74/89, 74/89.14, 89.16, 89.17, 422, 425, 412 R, 74/413, 414, 416, 417, 665 A, 665 B, 665 F, 74/665 G, 665 GA, 665 GB; 49/362
See application file for complete search history.

(56) References Cited

U.S. PATENT DOCUMENTS

| | | | | | |
|---|---|---|---|---|---|
| 2,336,530 | A | * | 12/1943 | Chandler et al. | 49/349 |
| 3,263,367 | A | * | 8/1966 | Tanaka | 49/349 |
| 4,255,981 | A | * | 3/1981 | Sigg | 74/665 A |
| 4,670,928 | A | * | 6/1987 | Alten | 14/71.3 |
| 4,757,725 | A | * | 7/1988 | Beugin | 74/422 |
| 4,858,491 | A | * | 8/1989 | Shube | 74/665 B |
| 5,329,828 | A | * | 7/1994 | Hurth | 74/661 |
| 5,653,144 | A | * | 8/1997 | Fenelon | 74/411 |
| 5,806,244 | A | * | 9/1998 | Tilli | 49/358 |
| 5,829,305 | A | * | 11/1998 | Ham et al. | 74/89.14 |
| 5,836,205 | A | * | 11/1998 | Meyer | 74/89.17 |
| 5,943,913 | A | * | 8/1999 | Fenelon | 74/411 |
| 5,946,859 | A | * | 9/1999 | Kramer et al. | 49/362 |
| 6,073,395 | A | | 6/2000 | Fenelon | |
| 6,119,402 | A | | 9/2000 | Wisner | |
| 6,145,252 | A | | 11/2000 | Fenelon | |
| 6,216,394 | B1 | | 4/2001 | Fenelon | |
| 6,283,422 | B1 | * | 9/2001 | Stoelinga | 248/188.2 |
| 6,364,496 | B1 | | 4/2002 | Boddy | |
| 6,366,400 | B1 | | 4/2002 | McLennan | |
| 6,523,436 | B2 | * | 2/2003 | Minowa et al. | 74/665 B |
| 6,591,552 | B1 | | 7/2003 | Rasmussen | |
| 6,820,369 | B2 | * | 11/2004 | Fenelon | 49/349 |
| 6,889,578 | B2 | * | 5/2005 | Spaziani et al. | 74/661 |
| 6,918,208 | B2 | | 7/2005 | Oberheide | |
| 6,955,009 | B2 | | 10/2005 | Rasmussen | |

(Continued)

*Primary Examiner*—Richard W L Ridley
*Assistant Examiner*—Phillip Johnson
(74) *Attorney, Agent, or Firm*—Manelli Denison & Selter; Edward J. Stemberger

(57) ABSTRACT

A window lift system (10) includes a support bracket structure (12) including gear structure (18, 20). A fixed rack structure (22, 24) is associated with the gear structure. A motor (16) is carried by the support bracket structure and the motor has a rotatable shaft. A gear train (28, 30, 32, 34) is associated with the shaft and with the gear structure such that rotation of the shaft moves the gear train, with the gear train driving the gear structure so as to move the support bracket structure with respect to the rack structure.

10 Claims, 3 Drawing Sheets

U.S. PATENT DOCUMENTS

| | | | | |
|---|---|---|---|---|
| 6,966,149 | B2 * | 11/2005 | Fenelon | 49/375 |
| 7,003,916 | B2 | 2/2006 | Nestell et al. | |
| 7,021,001 | B1 | 4/2006 | Schooler | |
| 7,150,698 | B2 * | 12/2006 | Sakamoto et al. | 477/5 |
| 2003/0069103 | A1 * | 4/2003 | Ibamoto et al. | 475/5 |
| 2006/0000300 | A1 * | 1/2006 | Vialle | 74/413 |

* cited by examiner

WINDOW LIFT DRIVE FOR RAISING AND LOWERING WINDOWS IN A VEHICLE DOOR

This application claims the benefit of the earlier filing date of U.S. Provisional Application No. 60/810,710, filed on Jun. 5, 2006, and claims the benefit thereof for priority purposes.

FIELD OF THE INVENTION

The present invention relates window lift drives for raising and lower a window in a vehicle.

BACKGROUND OF THE INVENTION

Automobiles typically include a window lift assembly for raising and lowering windows in the door of the vehicle. A common type of window lift assembly incorporates dual rack and pinion drive mechanism that includes a motorized input from a worm shaft that drives worm gear engaged directly with one of the pinions of the dual rack and pinion system.

Although the conventional dual rack and pinion mechanism works well for its intended purpose, there is a need to reduce the cost and improve the performance of the mechanism.

SUMMARY OF THE INVENTION

An object of the invention is to fulfill the need referred to above. In accordance with the principles of the present invention a window lift drive mechanism includes a support bracket structure including gear structure. A fixed rack structure is associated with the gear structure. A motor is carried by the support bracket structure and the motor has a rotatable shaft. A gear train is associated with the shaft and with the gear structure such that rotation of the shaft moves the gear train, with the gear train driving the gear structure so as to move the support bracket structure with respect to the rack structure.

In accordance with another aspect of the invention, a window lift system includes a support bracket structure including gear structure. The gear structure includes an input gear in engagement with an output gear. A window is carried by the support bracket structure. A fixed rack structure is associated with the gear structure. The rack structure includes a pair of racks in spaced relation with each rack having gear teeth. Each of the output gear and the input gear engages gear teeth of an associated rack. A motor is provided that has a rotatable shaft. A gear train is provided that includes a pinion associated with the shaft. At least first and second intermeshing gears are disposed on associated shafts. The shafts of the gears are in parallel relation. The first gear has an axis coaxial with an axis of the input gear and the second gear has an axis coaxial with an axis of the output gear. A third gear is in mesh with the pinion. The third gear engages the second gear. Rotation of the shaft and the pinion rotates the third gear which rotates the second gear causing the first gear to rotate, thereby driving the input gear and moving the support structure and window with respect to the racks.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
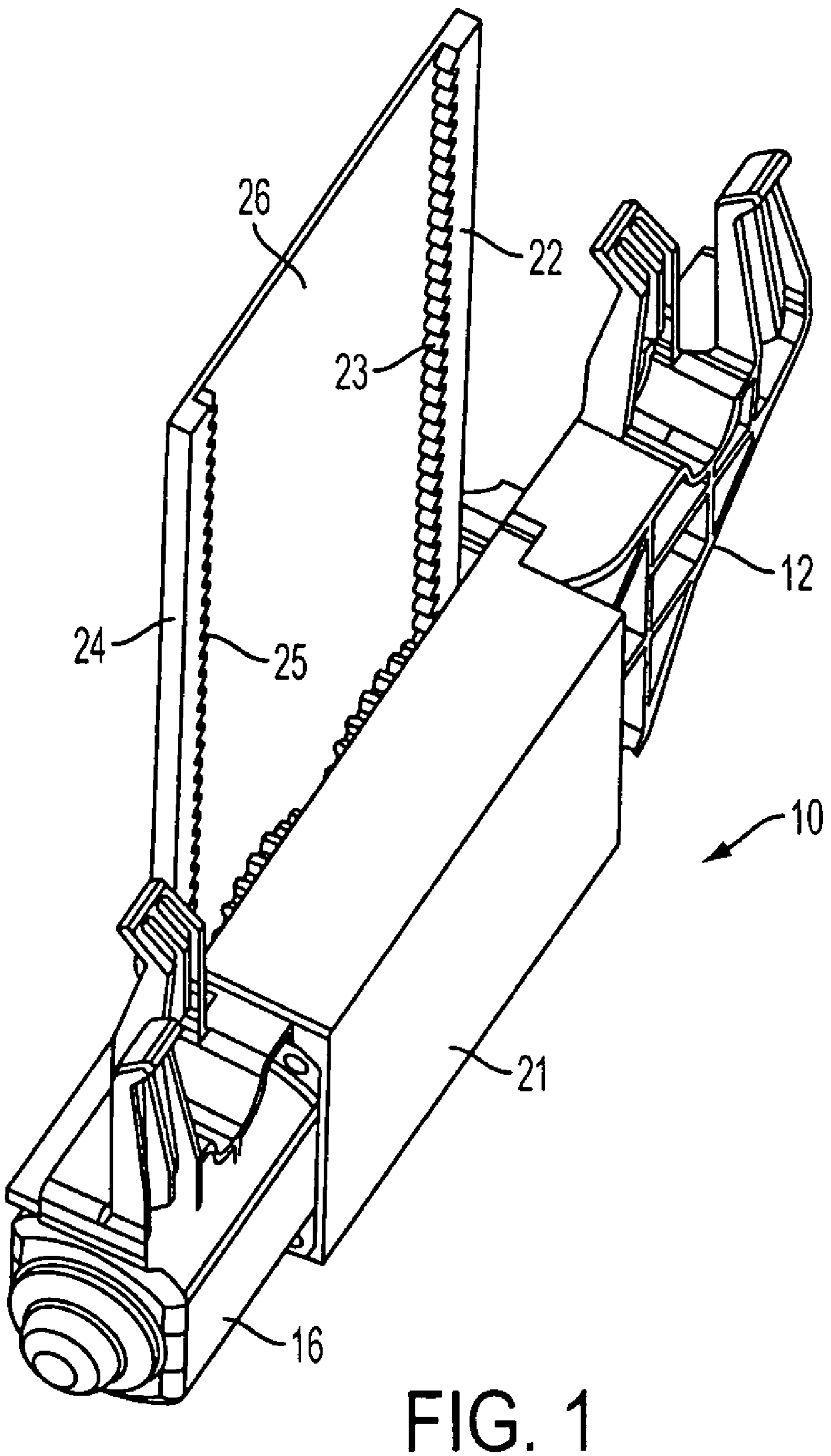
FIG. 1 is perspective view of a window lift system in accordance with the principles of an embodiment of the present invention, shown without a window attached.
Figure 2:
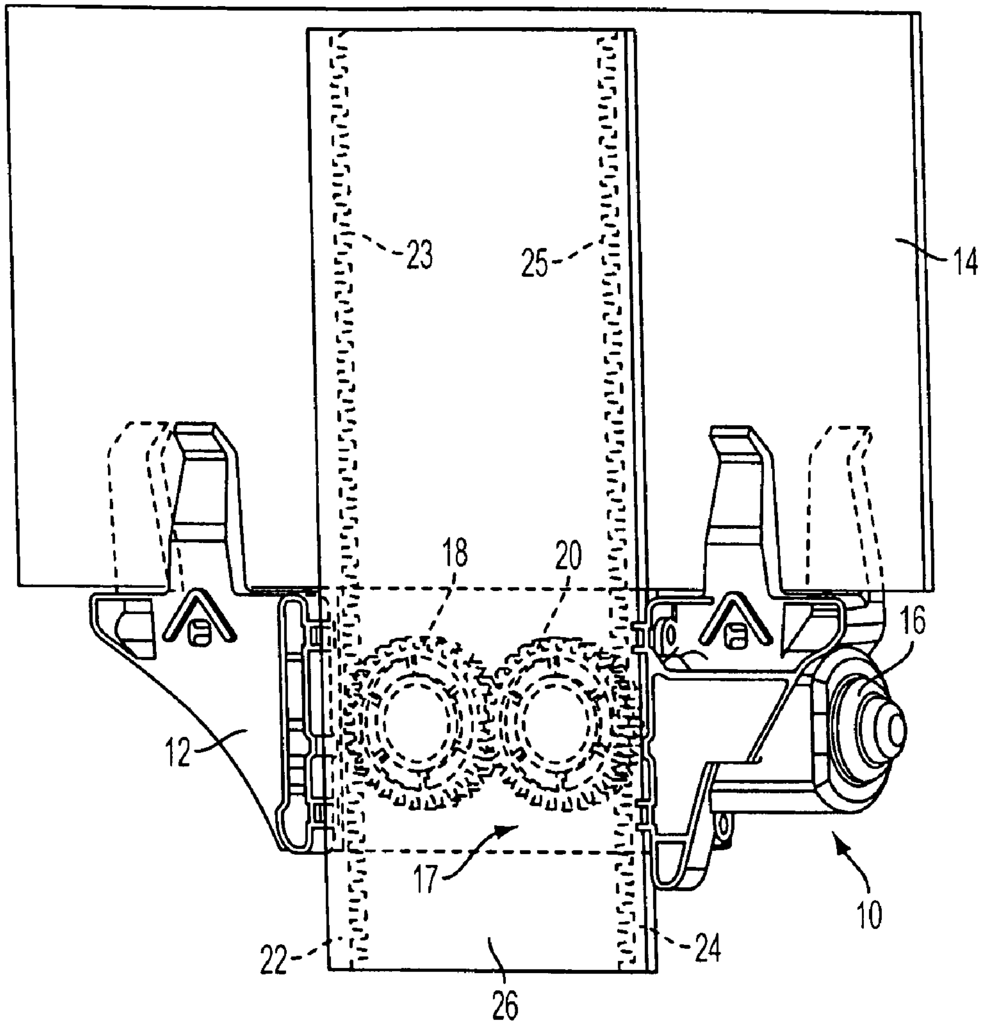
FIG. 2 is a rear view of the window lift system of FIG. 1, shown with a cover removed to show gear structure.

With reference to FIGS. 1-2, and 5 a window lift system is shown generally indicated at 10 in accordance with the principles of an embodiment of the present invention. The system 10 includes a support bracket structure 12 supporting or carrying a window 14 of a vehicle. A motor 16 is carried by the support bracket structure 12.

Figure 3:
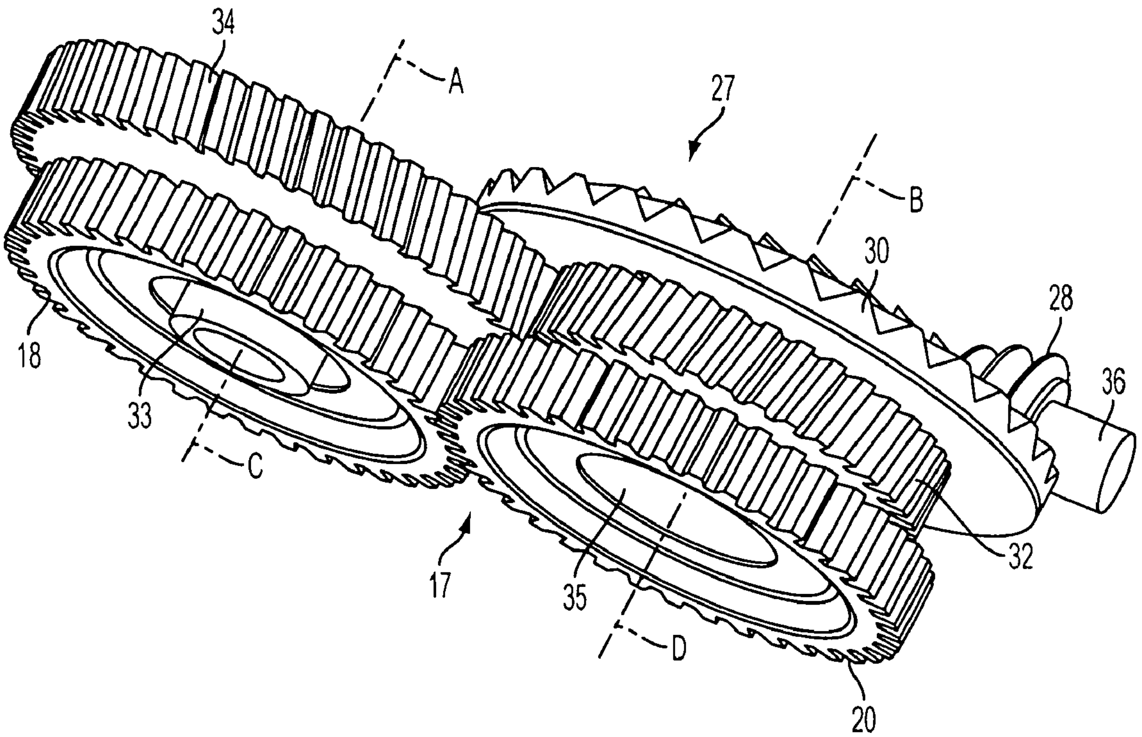
FIG. 3 is an enlarged perspective view of the gear structure together with a gear train of the window lift system of the embodiment.

With reference to FIGS. 2-3, the support bracket structure 12 holds gear structure, generally indicated at 17, including an input gear 18 that is in engagement with a mating output or driving gear 20. The cover 21 (FIG. 1) of the support bracket structure 12 is removed in FIG. 2. The gears 18 and 20 are in gear engagement with teeth 23, 25 of the respective racks 22 and 24. The racks 22 and 24 are fixed with respect a door (not shown) of the vehicle and are joined with a holding plate 26.

The support bracket structure 12 is a housing that houses both the gear structure 17 and a gear train, generally indicated at 27. The gear train 27 includes gears 28, 30, 32 and 34, all meshed in a train engagement (FIG. 3). Note that gear 28 is a pinion and can be considered to be part of a shaft 36 of the motor 16. This gear train has at least two gears 32 and 34 with parallel shafts 33, 35. The gear 34 has an axis A coaxial with an axis C of the input gear 18 and the gear 32 has an axis B coaxial with an axis D of the output gear 20.

The input gear 18 is driven by one of the gears (e.g. gear 34), which causes raising or lowering of the window 14 with respect to the racks 22 and 24 (See FIG. 2). More particularly, the motor 16 rotates the shaft 36 and the pinion 28 engages gear 30 which rotates gear 32 causing gear 34 to rotate. Since gear 34 and the input gear 18 are on a common shaft 33, the gear 34 drives the input gear 18. Gear 20 is not connected to gear 34. Rotation of the input gear 18 causes the support bracket structure 12 (with window 14) and motor 16 to move either upwardly or downwardly with respect to the racks 22 and 24.

This configuration reduces the number of parts in the power window lift system 20 as compared to conventional systems. The parallel shafts of the gear train transfer torque to the input gear 18 and also support the input gear 18 and the output gear 20.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A window lift drive mechanism comprising:

support bracket structure including gear structure, fixed rack structure associated with the gear structure, a motor carried by the support bracket structure, the motor having a rotatable shaft, and a gear train associated with the shaft and with the gear structure such that rotation of the shaft moves the gear train, with the gear train driving the gear structure so as to move the support bracket structure with respect to the rack structure, wherein rack structure includes a pair of racks in spaced relation, each rack having gear teeth, the gear structure including an input gear in engagement with an output gear, each of the output gear and the input gear engaging gear teeth of an associated rack, and wherein the gear train includes at least first and second intermeshing gears disposed on associated shafts, the shafts being in parallel relation, the first gear having an axis coaxial with an axis of the input gear and the second gear having an axis coaxial with an axis of the output gear, with the input gear being constructed and arranged to be driven by the first gear.

2. The mechanism of claim 1, wherein the gear train further includes a pinion associated with the shaft of the motor and a third gear engaged by the pinion, the third gear engaging the second gear, such that rotation of the shaft and pinion rotates the third gear which rotates the second gear causing the first gear to rotate, thereby driving the input gear.

3. The mechanism of claim 1, wherein the gear train and gear structure are housed by the support bracket structure.

4. The mechanism of claim 1, in combination with a window supported by the support bracket structure and movable upwardly and downwardly together with the support bracket structure.

5. The mechanism of claim 1, further comprising a support plate coupled between the two racks.

6. The mechanism of claim 1, wherein the input gear and the first gear are disposed on a common shaft.

7. A window lift system comprising:

a support bracket structure including gear structure, the gear structure including an input gear in engagement with an output gear, a window carried by the support bracket structure, a fixed rack structure associated with the gear structure, the rack structure including a pair of racks in spaced relation, each rack having gear teeth, each of the output gear and the input gear engaging gear teeth of an associated rack, a motor having a rotatable shaft, a gear train including a pinion associated with the shaft; at least first and second intermeshing gears disposed on associated shafts, the shafts being in parallel relation, the first gear having an axis coaxial with an axis of the input gear and the second gear having an axis coaxial with an axis of the output gear; and a third gear engaged by the pinion, the third gear engaging the second gear, wherein rotation of the shaft and the pinion rotates the third gear which rotates the second gear causing the first gear to rotate, thereby driving the input gear and moving the support structure and window with respect to the racks.

8. The system of claim 7, wherein the gear train is housed by the support bracket structure.

9. The system of claim 7, further comprising a support plate coupled between the two racks.

10. The system of claim 7, wherein the input gear and the first gear are disposed on a common shaft.

* * * * *